United States Patent [19]
Handa

[11] Patent Number: 4,678,110
[45] Date of Patent: Jul. 7, 1987

[54] VEHICLE BODY ASSEMBLY SYSTEM

[75] Inventor: Tatuhiro Handa, Hiroshima, Japan

[73] Assignee: Mazda Motor Corporation, Hiroshima, Japan

[21] Appl. No.: 737,425

[22] Filed: May 24, 1985

[30] Foreign Application Priority Data

May 26, 1984 [JP] Japan .................. 59-106721

[51] Int. Cl.$^4$ .............................................. B23K 37/00
[52] U.S. Cl. ...................................... 228/4.1; 228/45; 228/47
[58] Field of Search ................... 228/4.1, 45, 47, 49.1; 219/79, 80

[56] References Cited

U.S. PATENT DOCUMENTS

| 4,046,263 | 9/1977 | Cwycyshyn et al. | 228/45 X |
| 4,441,645 | 4/1984 | Takagishi et al. | 228/47 |

FOREIGN PATENT DOCUMENTS

| 2350603 | 4/1975 | Fed. Rep. of Germany | 228/47 |
| 53-21542 | 7/1978 | Japan . | |
| 575199 | 10/1977 | U.S.S.R. | 228/4.1 |

Primary Examiner—Nicholas P. Godici
Assistant Examiner—C. Cuda
Attorney, Agent, or Firm—Gerald J. Ferguson, Jr.; Michael P. Hoffman; Ronni S. Malamud

[57] ABSTRACT

A vehicle body assembly system for feeding various body components to body members conveyed in succession along a body assembly line and assembling together the body components and the body members into vehicle bodies, comprises at least one first component feeding station disposed along the vehicle body assembly line to feed a body component which can be placed by itself on the body member conveyed along the vehicle body assembly line, and at least one second component feeding station disposed along the vehicle body assembly line to feed a body component which cannot be placed on the body member by itself. A first robot is provided along the first component feeding station to accomplish welding into the first component at a sub-assembly table disposed near the first component feeding station and feed the welded first component to the body member. A locating device is disposed along the second component feeding station to feed and position the second component with respect to the body member at the second component feeding station. A second robot is disposed along the second component feeding station to feed the second component to the locating device and to weld the second component positioned with respect to the body member thereto.

3 Claims, 4 Drawing Figures

VEHICLE BODY ASSEMBLY SYSTEM

BACKGROUND OF THE INVENTION

1. Field of the Invention

This invention relates to a vehicle body assembly system for feeding various body components to vehicle body members conveyed in succession along a body assembly line and assembling the body components to the body members.

2. Description of the Prior Art

A vehicle body assembly system using robots is disclosed in Japanese Pat. Publication No. 53(1978)-21542. In the vehicle body assembly system, there are provided locating devices for feeding various body components such as a cab side to a body member such as an underbody conveyed along an assembly line and supporting the components in place with respect to the body member at predetermined stations along the assembly line. The locating devices are provided with a delivery device such as a manipulator for delivering the body components transferred to the locating devices by a part feeding device. Robots are provided at the stations to weld the body components positioned with respect to the body member by the locating devices to the body member.

The known system is disadvantageous in that since the robots are used exclusively for welding the components to the body member, waiting time of the robots is long and the time efficiency of the robots is low.

In order to improve the time efficiency of the robots, it has been proposed to provide the welding robots with functions to deliver the body components from the part feeding device to the locating device, thereby shortening the waiting time of the robots.

However, though effective for the components requiring a locating device, e.g., a cab side, the proposal is not so effective for components which can be directly assembled to the body member without assistance of a locating device, e.g., a roof panel or a cowl-and-dash panel, and accordingly, the time efficiency of the robots in the overall assembly line cannot be substantially improved.

SUMMARY OF THE INVENTION

In view of the foregoing observations and description, the primary object of the present invention is to provide an improved vehicle body assembly system in which the time efficiency of the robots in the overall assembly line can be substantially improved.

In accordance with the present invention, there is provided a vehicle body assembly system for feeding various body components to body members conveyed in succession along a body assembly line and assembling together the body members and the body components, comprising at least one first component feeding station disposed along the vehicle body assembly line to feed a body component which can be placed by itself on the body member conveyed along the vehicle body assembly line, at least one second component feeding station disposed along the vehicle body assembly line to feed a body component which cannot be placed on the body member by itself, a first robot provided along the first component feeding station which accomplishes welding into the first component at a sub-assembly table disposed near the first component feeding station and feeds the welded first component to the body member, a locating device disposed along the second component feeding station to feed and position the second component with respect to the body member on the second component feeding station, and a second robot disposed along the second component feeding station to feed the second component to the locating device and to weld the second component positioned with respect to the body member thereto.

Thus, in the assembly system of the present invention, the robots can contribute to two operations selected according to the kind of the component to be handled, i.e., whether or not the component can be placed on the body member by itself, whereby the time efficiency of the robots in the overall assembly line can be substantially improved.

DESCRIPTION OF THE PREFERRED EMBODIMENT

Figures 1, 4:
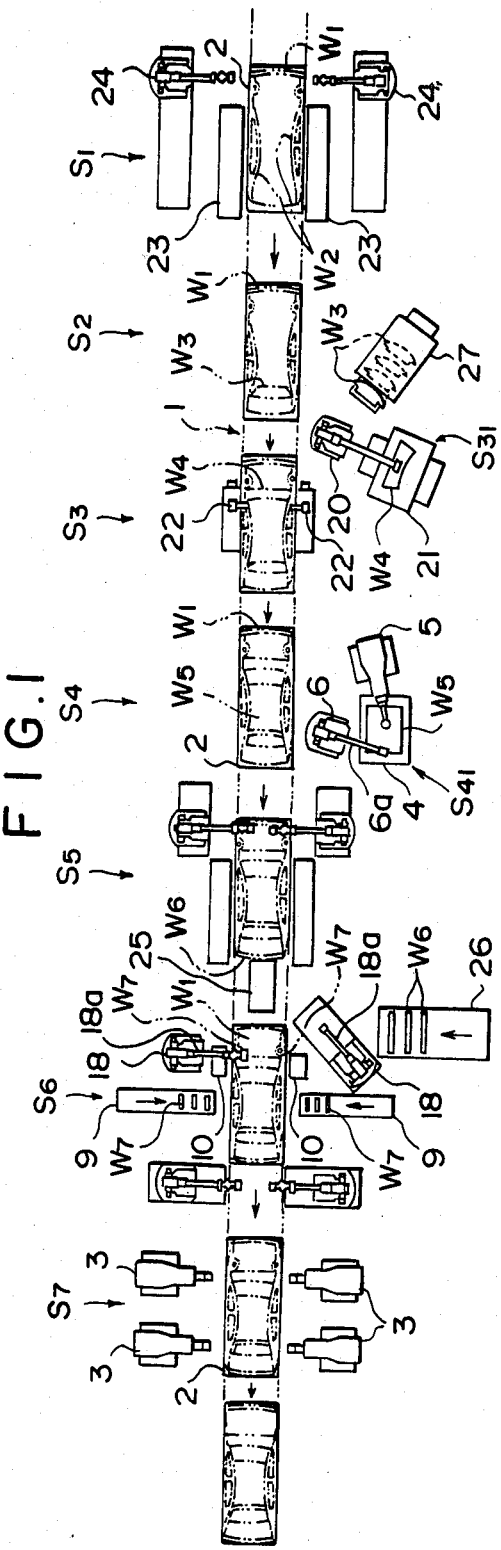
FIG. 1 is a schematic plan view of a vehicle body assembly system in accordance with an embodiment of the present invention.
FIG. 4 is a schematic plan view for illustrating the components to be handled in the vehicle body assembly system of FIG. 1.

In FIG. 1, reference numeral 1 denotes a vehicle body assembly line in which underbodies W1 (See FIG. 4.) are intermittently conveyed in succession from the right to the left as seen in FIG. 1 by lifters 2. There are formed a cab side feeding station S1, a package tray feeding station S2, a cowl-and-dash panel feeding station S3, a roof panel feeding station S4, a rear end panel feeding station S5 and a wheel apron feeding station S6 respectively for feeding right and left cab sides W2, a package tray W3, a cowl-and-dash panel W4, a roof panel W5, a rear end panel W6 and right and left wheel aprons W7 to the underbody W1 on each lifter 2, and a welding station for regularly welding the components W2 to W7 to the underbody by welding robots 3. Among the components W2 to W7, the cowl-and-dash panel W4 and the roof panel W5 can be directly placed on the underbody W1 (the first components), while the right and left cab sides W2, the rear end panel W6 and the wheel aprons W7 cannot be placed on the underbody W1 by themselves (the second components).

Figure 2:
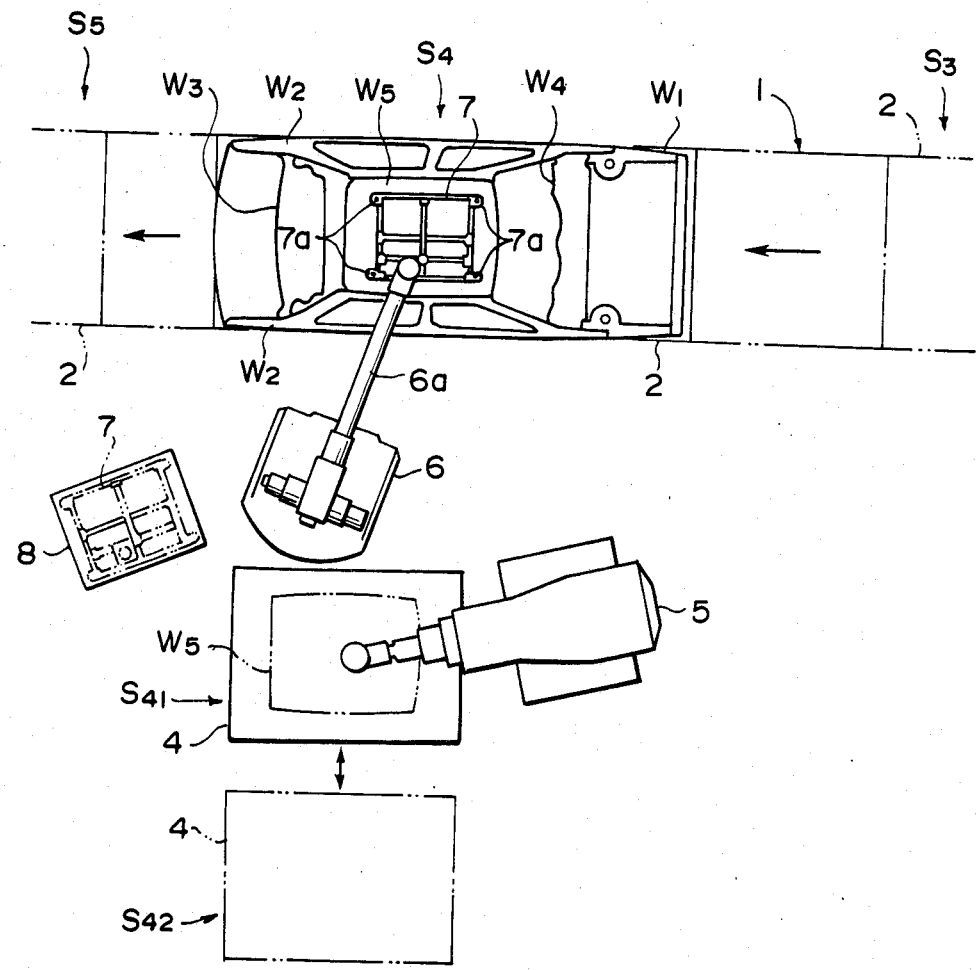
FIG. 2 is a schematic plan view of a roof panel feeding station in the vehicle body assembly system of FIG. 1.

On the floor along the roof panel feeding station S4, a sub-assembly table 4 is mounted to be movable between a first position near the roof panel feeding station S4 and a second position remote therefrom as shown in detail in FIG. 2. Corresponding to the first position of the sub-assembly table 4, there is provided a sub-welding station S41 for subwelding roof panel components into the roof panel W5 on the sub-assembly table 4, while there is provided a roof panel component combining station S42 corresponding to the second position of the sub-assembly table, 4 for combining the roof panel components before sub-welding thereof.

There is provided a welding robot 5 beside the sub-welding station S41. Further, there is provided a welding/feeding robot 6 between the roof panel feeding station S4 and the sub-welding station S41 near the sub-assembly table 4 on the sub-welding station S41. The welding/feeding robot 6 has an arm 6a to which a roof panel holder 7 for holding the roof panel W5 with suction cups 7a and a welding gun (not shown) for sub-welding of the roof panel W5 are selectively chucked. The welding/feeding robot 6 accomplishes sub-welding into the roof panel W5 on the sub-assembly table 4 together with the welding robot 5 with the welding gun chucked to the arm 6a. During the sub-welding, the roof panel holder 7 is placed on a holder placing table 8. When sub-welding into a roof panel W5 is completed, the roof panel holder 7 is chucked to the arm 6a in place of the welding gun, and the welding/feeding robot 6 feeds the welded roof panel W5 to the underbody W1 on the lifter 2 at the roof panel feeding station S4. A wheel apron feeding conveyor 9 is disposed on each side of the wheel apron feeding station S6 for transferring the wheel aprons W7 into the wheel apron feeding station S6. A wheel apron locating device 10 is provided opposed to each wheel apron feeding conveyor 9 for feeding each wheel apron W7 to the underbody W1 at the wheel apron feeding station S6 and supporting it in place with respect to the underbody W1. Further a welding/feeding robot 18 is provided opposed to each wheel apron feeding conveyor 9 for feeding the wheel apron W7 on the wheel apron feeding conveyor 9 to the wheel apron locating device 10 and welding the wheel apron W7 positioned by the wheel apron locating device 10 to the underbody W1.

Figure 3:
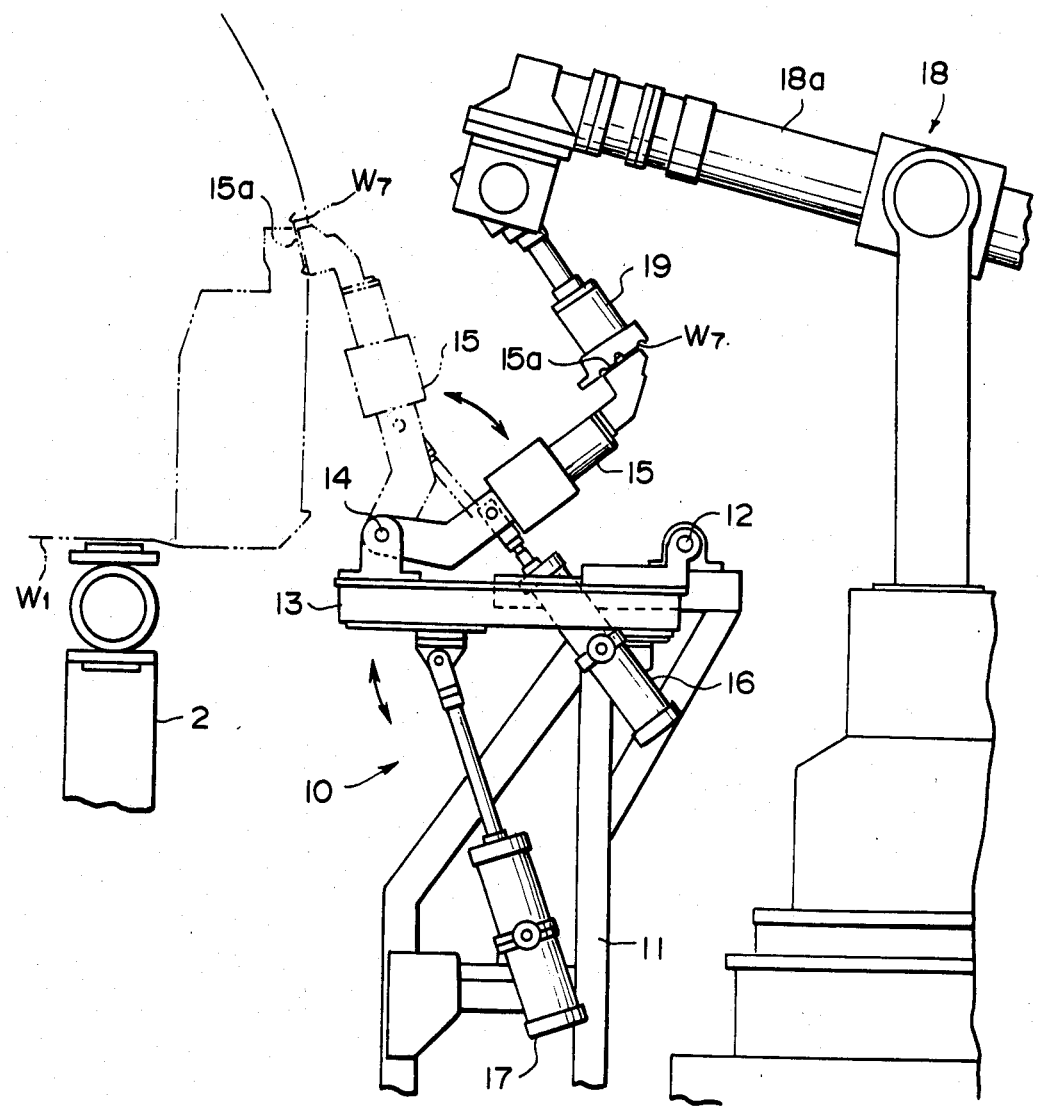
FIG. 3 is a schematic side view of a wheel apron feeding station in the vehicle body assembly system of FIG. 1.

As shown in FIG. 3, each wheel apron locating device 10 comprises a base 11 mounted beside the lifter 2 at the wheel apron feeding station S6, a pivoted table 13 pivoted on the end portion of the base 11 remote from the lifter 2, an arm member 15 pivoted on the end portion of the pivoted table 13 adjacent to the lifter 2 by way of a shaft 14, a piston/cylinder unit 16 for swinging the arm member 15 and a piston/cylinder unit 17 for swinging the pivoted table 13. The arm member 15 is mounted for swinging motion between an erect position close to the lifter 2 as shown by the chained line in FIG. 3 and an inclined position removed from the lifter 2 as shown by the solid line in FIG. 3. The arm member 15 is provided with a holder portion 15a at the free end thereof. The wheel apron locating device 10 receives the wheel apron W7 by way of the holder portion 15a with the pivoted table 13 positioned in the horizontal position and the arm member 15 in the inclined position, and positions the received wheel apron W7 with respect to the underbody W1 by rotating the arm member 15 in the counterclockwise direction to the erect position.

The welding/feeding robot 18 has an arm 18a to which a wheel apron holder 19 for holding the wheel apron W7 with suction cups and a welding gun (not shown) for welding the wheel apron W7 to the underbody W1 are selectively chucked. The welding/feeding robot 18 holds the wheel apron W7 on the wheel apron feeding conveyor 9 with the wheel apron holder 19 and feeds it to the holder portion 15a of the arm member 15 in the inclined position, while, with the welding gun being chucked to the arm 18a in place of the wheel apron holder 19, the welding/feeding robot 18 welds the wheel apron W7 positioned with respect to the underbody W1 thereto.

As at the roof panel feeding station S4, a welding/feeding robot 20 is provided along the cowl-and-dash panel feeding station S3. The welding/feeding robot 20 welds the cowl-and-dash panel components into the cowl-and-dash panel W4 on a sub-assembly table 21 disposed at a cowl-and-dash panel sub-assembly station S31, and feeds the welded cowl-and-dash panel W4 to the underbody W1 at the cowl-and-dash panel feeding station S3. The cowl-and-dash panel W4 fed to the underbody W1 by the welding/feeding robot 20 is welded to the underbody W1 by welding robots 22.

A cab side locating device 23 for feeding the cab side W2 and positioning it with respect to the underbody W1 at the cab side feeding station S1 is provided on each side of the cab side feeding station S1. Further, there is disposed on each side of the cab side feeding station S1 a welding/feeding robot 24 for feeding the cab side W2 transferred by a cab side feeding conveyor (not shown) to the cab side locating device and welding the cab side W2 to the underbody W1.

A rear end panel locating device 25 is disposed along the rear end panel feeding station S5 for locating the rear end panel W6 with respect to the underbody W1 at the rear end panel feeding station S5. One of the welding/feeding robots 18 described above in conjunction with the wheel apron feeding station S6 (the lower one as seen in FIG. 1) functions also as the welding/feeding robot at the rear end panel feeding station S5 for feeding the rear end panel W6 transferred by a rear end panel feeding conveyor 26 to the rear end panel locating device 25 and welding it to the under body W1.

On one side of the package tray feeding station S2 is disposed a package tray feeding conveyor 27 for transferring the package trays W3 to the package tray feeding station S2. Each package tray W3 on the conveyor 27 is fed to the underbody W1 at the package tray feeding station S2 by a feeding device (not shown).

Now the operation of the vehicle body assembly system of the present invention will be described in detail. When the underbody W1 is placed on the lifter 2 and fed along the vehicle body assembly line 1, the right and left cab sides W2 are first fed to the underbody W1 on the lifter 2 at the cab side feeding station S1. Thereafter, the package tray W3, the cowl-and-dash panel W4, the roof panel W5, the rear end panel W6 and the right and left wheel aprons W7 are fed to the underbody W1 at the respective stations S2 to S6 in this order. And then, the components W2 to W7 are regular-welded to the underbody W1 by the welding robots 3 at the welding station S7.

Before the underbody W1 is conveyed to the roof panel feeding station S4, roof panel components are assembled into the roof panel W5 on the sub-assembly table 4 at the roof panel component combining station S42, and then the subassembly table 4 is moved from the roof panel component combining station S42 to the sub-welding station S41. At the sub-welding station S41, the roof panel components are welded into the roof panel W5 by the welding/feeding robot 6 and the welding robot 5, and then the roof panel holder 7 on the holder placing table 8 is chucked in place of the welding gun.

When the underbody W1 is conveyed to the roof panel feeding station S4 from the cowl-and-dash panel feeding station S3, the roof panel W5 on the sub-assembly table 4 at the sub-welding station S41 is fed to the underbody W1 by the welding/feeding robot 6 to which the roof panel holder 7 is chucked. That is, the roof panel W5 is placed on the right and left cab sides welded in the vertical position to the underbody W1 at the cab side feeding station S1.

The underbody W1 provided with the roof panel W5 is conveyed to the rear end panel feeding station S5 from the roof panel feeding station S4 while the welding/feeding robot 6 returns the roof panel holder 7 to the holder placing table 8 and the welding gun is chucked to the robot 6 in place of the roof panel holder 7. This completes one cycle of the operation at the roof panel feeding station S4.

When the underbody W1 is conveyed to the wheel apron feeding station S6 from the rear end panel feeding station S5, the wheel apron holder 19 is chucked to each welding/feeding robot 18, and the welding/feeding robot 18 holds the wheel apron W7 on the wheel apron feeding conveyor 9 and feeds it to the holder portion 15a of the arm 15 of each wheel apron locating device 10 in the inclined position. The arm 15 of each wheel apron locating device 10 is swung to the erect position by extension of the cylinder/piston unit 16, and the wheel apron W7 held by the holder portion 15a of the arm 15 is positioned with respect to the underbody W1 at the wheel apron feeding station S6. At this time, the welding gun is chucked to each welding/feeding robot 18 in place of the wheel apron holder 19, and the robots 18 weld the wheel aprons W7 to the underbody W1.

The underbody W1 to which the right and left wheel aprons W7 are welded is conveyed from the wheel apron feeding station S6 to the welding station S7, and at the same time, the wheel apron holders 19 are chucked to the welding/feeding robots 18 in place of the welding gun. This cycle is repeated at the wheel apron feeding station S6.

The operations at the cowl-and-dash panel feeding station S3 are similar to those at the roof panel feeding station S4, and the operations at the cab side feeding station S1 and rear end panel feeding station S5 are similar to those at the wheel apron feeding station S6. That is, the cowl-and-dash panel feeding station S3 and the roof panel feeding station S4 constitute said first component feeding stations and the cab side feeding station S1, the rear end panel feeding station S5 and the wheel apron feeding station S6 constitute said second component feeding stations.

In the vehicle body assembly system of this embodiment, the welding/feeding robots 6 and 20 at the first component feeding stations accomplish both sub-welding of the first components (the roof panel W5 and the cowl-and-dash panel W4) on the sub-assembly tables 4 and 21, and feeding of the first components to the underbody W1. The welding/feeding robots 18 and 24 at the second component feeding stations accomplish both feeding of the second components (the wheel aprons W7, the cab sides W2 and the rear end panel W6) to the locating devices 10, 23 and 25 and welding of the second components positioned with respect to the underbody W1 by the locating devices 10, 23 and 25 to the underbody W1. Thus, the waiting time of the robots 6, 20, 18 and 24 is shortened, thereby substantially improving the time efficiency of the robots in the overall assembly line 1.

I claim:
1. A vehicle body assembly system for feeding various body components to respective body members conveyed in succession along a vehicle body assembly line and assembling the body member and the body components together, comprising:
at least one first component feeding station means disposed along the vehicle body assembly line for feeding a body component of a first type which can be placed by itself on the body member which is being conveyed along the vehicle body assembly line, onto the body member;
at least one second component feeding station means disposed along the vehicle body assembly line for feeding a body component of a type which cannot be placed by itself on the body member which is being conveyed along the vehicle body assembly line, onto the body member;
at least one first robot associated with and provided adjacent to the at least one first component feeding station means for welding the first type of component at a sub-assembly table which is disposed near the first component feeding station means and for placing the welded first type of component onto the body member;
a locating device associated with and disposed adjacent to the second component feeding station means for feeding and positioning the second type of component with respect to the body member at the second component feeding station means; and
at least one second robot associated with and provided adjacent to the second feeding component feeding station means for feeding the second type of component to the locating device and welding the at least one second type of component, which is positioned with respect to the body member, onto the body member,
wherein the at least one first robot and the at least one second robot each comprise a single robot arm having a detachable end for feeding the components which can be replaced with an arm end for performing a welding operation.

2. A vehicle body assembly system as defined in claim 1, further comprising a cab side station means which is disposed upstream of the at least one first component feeding station means and the at least one second component station means, wherein the first type of component comprises a roof panel and a cowl-and-dash panel, and the second type of component comprises a rear end panel and a wheel apron.

3. A vehicle body assembly system as defined in claim 2, further comprising a welding station means which is disposed downstream of said at least one first component feeding station means and said at least one second component feeding station means to accomplish regular welding of the components fed to the body member at the respective station means.

* * * * *